United States Patent [19]
Janik

[11] Patent Number: 5,578,221
[45] Date of Patent: Nov. 26, 1996

[54] FUEL FILTER WITH IMPROVED HAND PRIMER

[75] Inventor: Leon P. Janik, Suffield, Conn.

[73] Assignee: Stanadyne Automotive Corp., Windsor, Conn.

[21] Appl. No.: 363,417

[22] Filed: Dec. 23, 1994

[51] Int. Cl.$^6$ ................................................ B01D 35/26
[52] U.S. Cl. ........................... 210/767; 210/741; 210/90; 210/136; 210/416.4; 123/179.11; 123/198 C
[58] Field of Search ..................................... 210/90, 416.4, 210/136, 767, 741; 417/568; 123/179.9, 198 C, 179.11

[56] References Cited

U.S. PATENT DOCUMENTS

| | | | |
|---|---|---|---|
| 4,437,986 | 3/1984 | Hutchins | 210/416.4 |
| 4,500,425 | 2/1985 | Thornton et al. | 210/416.4 |
| 4,515,690 | 5/1985 | Yasuhara | 210/90 |
| 5,207,898 | 5/1993 | Hodgkins | 210/416.4 |
| 5,362,392 | 11/1994 | Jensen | 210/416.4 |

*Primary Examiner*—Robert J. Popovics
*Attorney, Agent, or Firm*—Chilton, Alix & Van Kirk

[57] ABSTRACT

A fuel filter assembly employs a disposable filter cartridge disposed in a housing comprising a container and a cap. The cap comprises a cap member composed of elastomeric material, an externally projecting fuel outlet, and a centrally disposed axially extending conduit. A lower portion of the axial conduit is slidably received by an axial opening in a plate mounted on the top of the filter cartridge. The opening and conduit are dimensioned such that a gap between the opening and the conduit allows fluid flow through the plate. A spring biases the upper part of the cap member away from the filter cartridge. A fuel inlet in the container provides a path for the flow of fuel into the filter assembly. Spherical balls captured in the fuel inlet and fuel outlet act as check valves, preventing the flow out through the fuel inlet and in through the fuel outlet. The filter assembly is primed by pushing the cap member downwards, compressing the spring. Trapped air is expelled through an orifice and the conduit and exits the fuel filter assembly via the fuel outlet. Removing the downwards force allows the spring to return to its normal length, forcing the upper portion of the cap member upwards and creating a low pressure. The low pressure seats the cap assembly ball and unseats the container assembly ball, providing a driving head which causes fuel to flow from the fuel tank to the fuel filter assembly.

24 Claims, 5 Drawing Sheets

FUEL FILTER WITH IMPROVED HAND PRIMER

BACKGROUND OF THE INVENTION

This invention relates generally to devices for filtering and separating fluids. More particularly, the present invention relates to fuel filters for removing foreign particles and separating water from the fuel of the fuel supply system of an internal combustion engine.

The absence of high standards of quality control in diesel fuel supplies dictates that an effective fuel filter be incorporated into the fuel supply system of a diesel engine. Diesel fuel supplies frequently contain significant quantities of abrasive particles and water which present the potential for permanent damage to the components of the fuel injection pump, the fuel delivery system and the engine.

A multitude of conventional fuel filters employ a base which mounts a disposable filter cartridge. The cartridge is secured to the base by a collar which engages against a roll seam structure of the cartridge. The disposable filter cartridge is replaced at pre-established intervals of filter usage. In some conventional embodiments, the cartridge includes a single stage filter system wherein fuel flows axially and radially through a filter element for removing particulate matter. Filtered fuel flows axially and exits through an outlet passage of the base. The filter element may also function as a water barrier. The separated water may be collected in a sump and periodically removed.

When the filter cartridge is changed, air may be trapped in such filters forming an air pocket at the top of the fuel filter. For pressurized fuel delivery systems, the air pockets tend to be absorbed over time, into the filtered fuel. The air pockets generally do not result in the formation of large air bubbles in the fuel supply partly due to the vapor pressure of the pressurized fuel. Consequently, for pressurized systems, air pockets in the fuel filter generally do not present a significant problem or obstacle to the circulation of fuel through the fuel filter and the delivery of fuel to the engine.

However, in vacuum applications, the formation of air pockets in the fuel circulating through the filter can present a more significant problem. The initial air pocket may "vapor lock" the fuel filter, preventing the flow of fuel. The air pockets are much more resistant to absorption over time in vacuum systems. Moreover, the vacuum may result in the formation of tiny air bubbles or "gassing" in the fuel, especially as the filter element approaches the end of its useful life and the pressure drop across the filter media increases. This increasing restriction to flow causes more air to be pulled from the fuel as the differential pressure between the clean side and the dirty side increases. In and of themselves, these individual tiny bubbles do not present a problem to normal vehicle operation as they are easily ingested by the fuel injection pump. When subjected to pump charging pressures, the tiny bubbles are ordinarily reabsorbed by the fuel.

The problems in vacuum systems initially arise on the clean side of the filter element where the small bubbles inevitably collect, agglomerate and form air pockets, e.g., large bubbles. The large bubble formation will continue over a period of time until the physical attitude of the filter element changes due to vehicle maneuvering, etc. When these relatively large air pockets or bubbles escape into the fuel flow, they are not easily ingested and may cause engine operating problems such as stalling, stumbling or irregular idle.

SUMMARY OF THE INVENTION

Briefly stated, the invention in a preferred form is a fuel filter assembly which comprises a container assembly and a cap assembly defining a housing and a disposable filter cartridge disposed within the housing. The cap assembly is locked to the container assembly by means of a retainer collar. The fuel filter assembly is particularly adapted for incorporation into a fuel supply system which is operated under a vacuum.

The container assembly comprises a container member having first and second passages defining a fuel inlet. A check valve is housed in the first passage to prevent the flow of fuel out of the fuel filter assembly through the inlet passage. The cap assembly is comprised of a cap member, a conduit member and outlet member. The cap member has a resilient elastomeric material composition. The cap member has an axial opening and a lower surface which is engageable with an upper surface on the container member to seal the cap assembly to the container assembly.

The conduit member comprises a flange and a stepped sleeve-like conduit which extends downwardly from the flange. The conduit is comprised of an upper first portion, a lower second portion, and an intermediate third portion. The inside diameter of the third portion tapers from the upper end to the lower end, defining a conical seating surface. The flange is attached to the bottom surface of the cap member such that the conduit is generally coaxial with the cap member opening.

The outlet member comprises first and second portions that define first and second passages, respectively. The first passage is in fluid communication with the second passage. The member first portion is received by the cap member opening and the conduit first portion wherein the first passage is substantially coaxial with the cap member opening and conduit. The first passage has an upper first portion and a lower second portion wherein the inside diameter of the second portion is greater than the diameter of the first portion. A spherical ball housed in the second portion of the first passage seats against the tapered passage of the conduit third portion, preventing flow through the outlet member into the fuel filter assembly. The reduced diameter of the first portion of the first passage prevents the ball from leaving the second portion of the first passage.

The disposable filter cartridge comprises a filter element which defines an interior axial chamber. The upper and lower ends of the element are engaged by upper and lower plates. The upper plate has a central axial opening that slidably receives the conduit. The upper plate opening and the conduit are dimensioned to provide a loose fit, allowing the flow of fuel through the gap between the opening and the conduit. A central portion of the upper plate forms a cup-like receptacle which defines a cavity for receiving a first end of a spring. The spring is disposed around the conduit. The second end of the spring bears against the conduit member flange, biasing the flange away from the filter cartridge.

The fuel filter assembly may be primed by pushing the upper portion of the cap member downwards. The downwards force will compress the spring allowing the upper portion of the cap member to be pushed into the upper cavity. Air that is trapped in the upper cavity will be expelled from the cavity through an orifice and the conduit. The air inflow causes the cap assembly ball to unseat and the container assembly ball to seat, allowing the air to exit the fuel filter assembly via the conduit and preventing fuel from leaving the fuel filter assembly via the inlet. Removing the downwards force allows the spring to return to its normal length, forcing the upper portion of the cap member upwards. This causes a low pressure to develop in the upper cavity which is communicated to the filter element annular cavity and container via the gap between the conduit and the plate central opening. The low pressure causes the cap assembly ball to seat, preventing fuel flow and air from entering the fuel filter assembly through the outlet member. The low pressure also causes the container assembly ball to unseat, providing a driving head causing fuel to flow from the fuel tank to the fuel filter assembly.

The cap member provides a visual indication of the fouling of the filter element. As the fuel filter assembly removes particulate matter from the fuel, the filter element becomes fouled and a higher differential pressure is required to draw fuel through the element. In a vacuum application, this results in an increased vacuum in the filter element annular cavity. Continued use causes increased fouling and a resultant increase in vacuum in the filter element annular cavity. The spring force of the spring is selected such that atmospheric pressure acting on the outside surface of the cap member and the vacuum acting on the inside surface of the cap member will start to overcome the spring force when the fouling has reached a predetermined value. As the fouling increases past this value, the increased vacuum will cause the cap member upper portion to progressively collapse towards the container assembly, thereby providing a visual and tactile indication that the filter element must be changed.

An object of the invention is to provide a new and improved fuel filter assembly adaptable for use in filtering fuel supplied to an internal combustion engine.

Another object of the invention is to provide a new and improved fuel filter assembly having efficient low cost construction which is especially adapted for incorporation into a fuel supply system which operates under a vacuum.

A further object of the invention is to provide a new and improved fuel filter assembly which is easily primed to remove air trapped in the assembly.

A still further object of the invention is to provide a new and improved fuel filter assembly which provides a visual indication that the disposable filter cartridge must be changed.

Other objects and advantages of the invention will become apparent from the drawings and the specification.

DETAILED DESCRIPTION OF THE PREFERRED EMBODIMENTS

Figure 1:
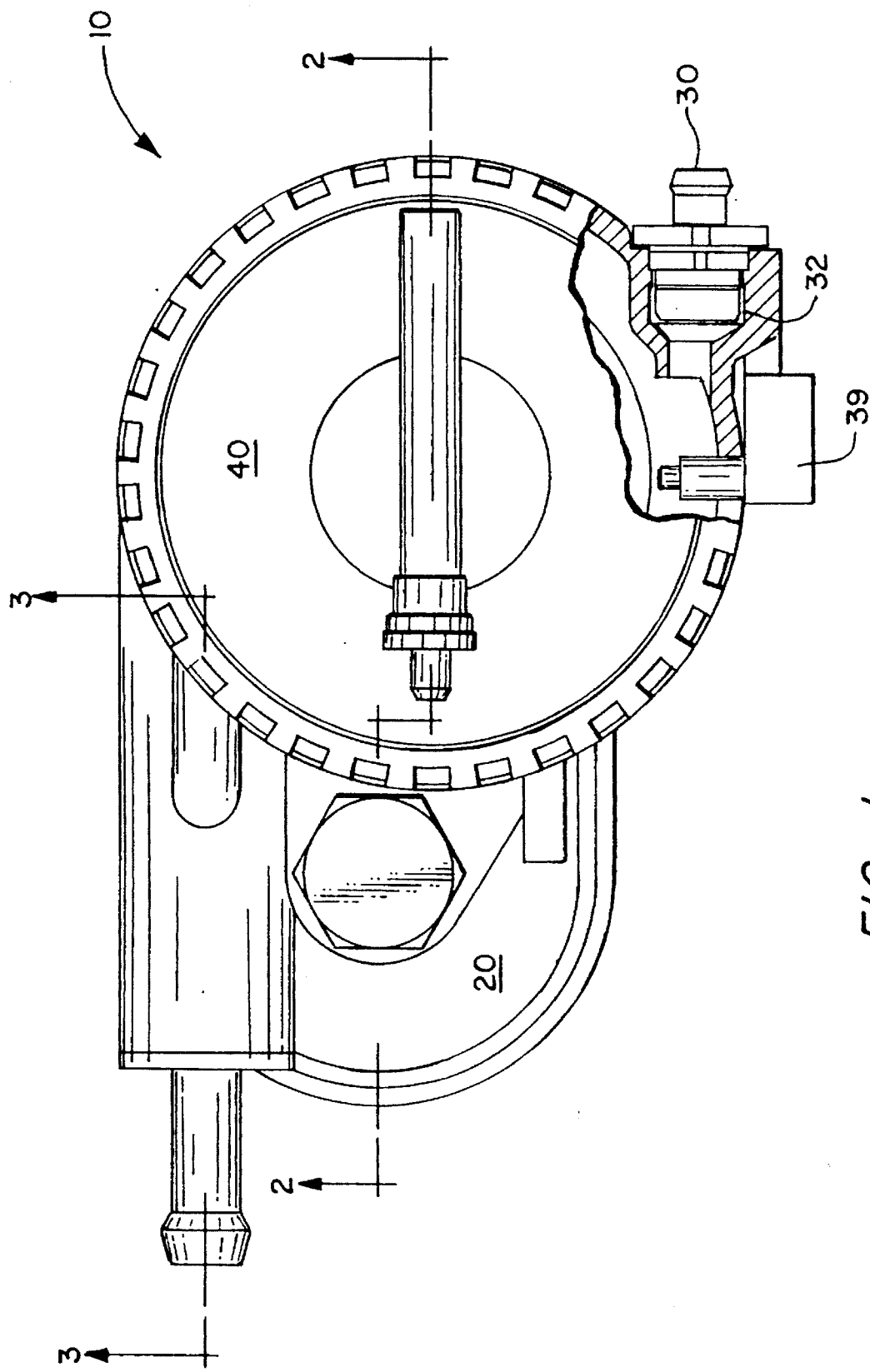
FIG. 1 is a top plan view, partly broken away and partly in section, of a fuel filter assembly in accordance with one embodiment of the invention.

With reference to the drawings wherein like numerals represent like parts throughout the several figures, a fuel filter assembly in accordance with the present invention is generally designated by the numeral 10. Fuel filter assembly 10 comprises a container assembly 20, a cooperative cap assembly 40 and a disposable filter cartridge 90. The disposable filter cartridge 90 is disposed within a housing 12 defined by the container assembly 20 and the cap assembly 40. The cap assembly 40 is locked to the container assembly 20 by means of a retainer collar 14. The fuel filter assembly 10 is especially adapted for incorporation into the fuel supply system of an internal combustion engine (not illustrated), such as a diesel engine, for removing particulate matter from fuel and separating the water from the fuel. The fuel filter assembly 10 is particularly adapted for incorporation into a fuel supply system which is operated under a vacuum.

Figure 2:
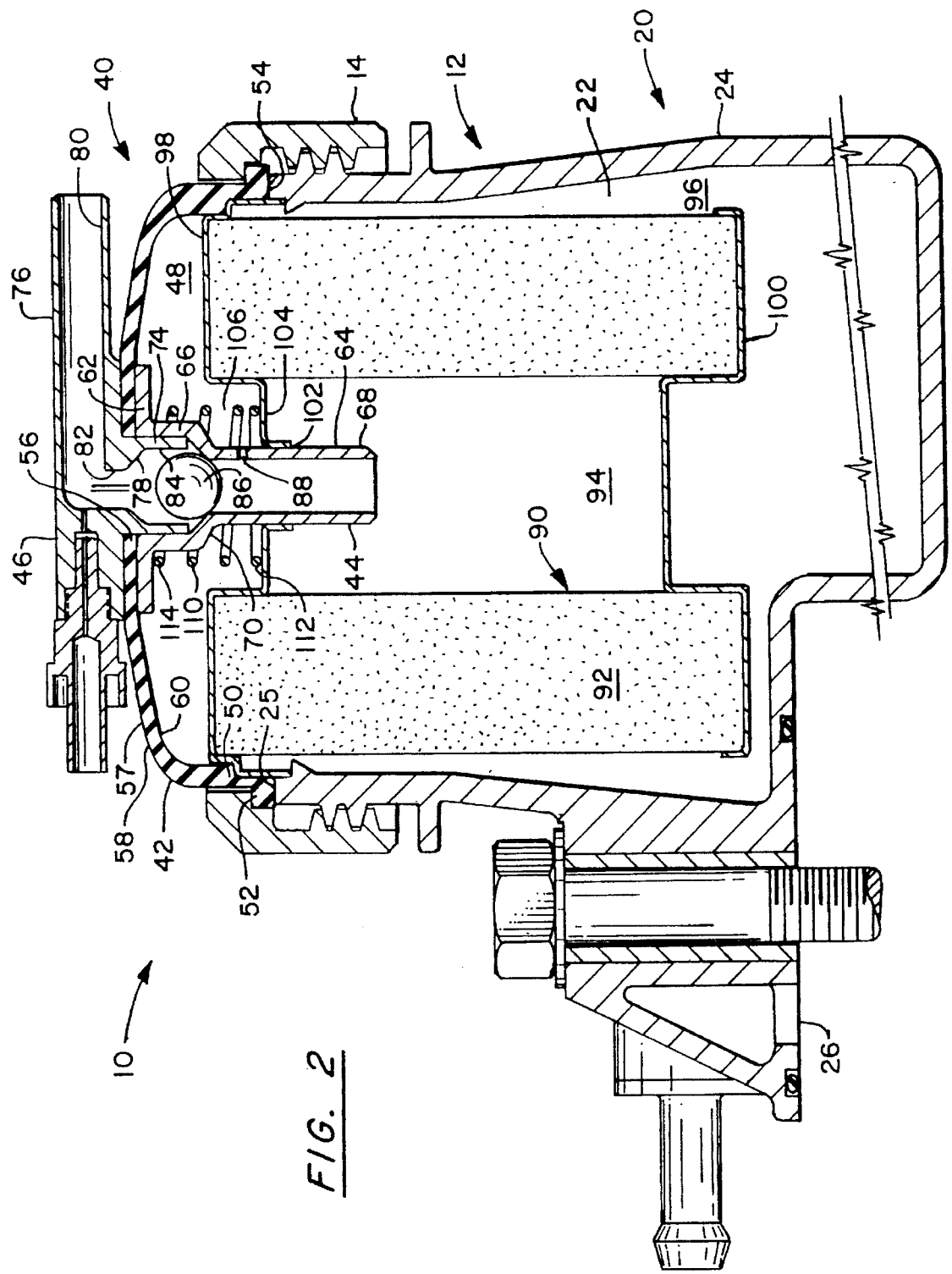
FIG. 2 is a sectional view of the fuel filter assembly of FIG. 1 taken along line 2—2 thereof.

The container assembly 20 and the disposable cartridge 90 may assume a wide variety of configurations. As shown in FIG. 2, the container assembly 20 is a cup-like receptacle which defines a cavity 22 for receiving lower portions of the disposable cartridge 90. The container assembly is comprised of a container member 24 and associated bracket means 26. In the embodiment shown in FIG. 2, the bracket means 26 is integral with the container member 24. Alternatively, the container member 24 and bracket means 26 may be separate components which are joined by fasteners or other suitable means. The container member 24 has an upper circumferential threaded surface and upwardly terminates in a rim 25.

Figure 3:
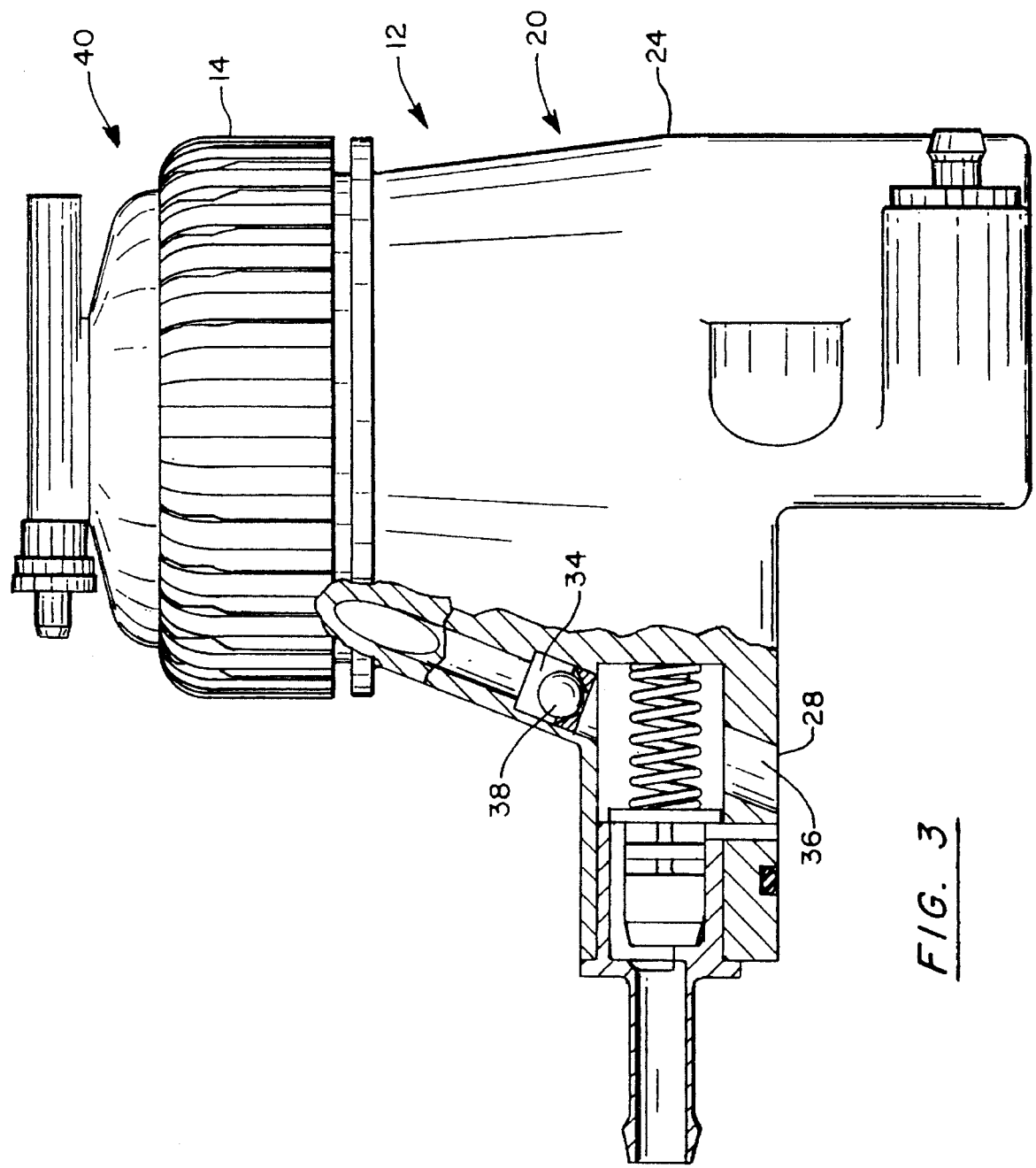
FIG. 3 is a side elevational view of the fuel filter cartridge of FIG. 1, partly broken away and partly in section, taken along the line 3—3 thereof.

With additional reference to FIG. 3, the container assembly includes a fuel inlet 28 which provides fluid communication between the fuel filter assembly 10 and the fuel tank (not shown) for the flow of fuel into the fuel filter assembly 10. In a preferred embodiment, the fuel inlet 28 is comprised of aligned first and second passages 34, 36 in the container member 24. The first passage 34 is in fluid communication with the second passage 36. A spherical ball 38 is captured in the first passage 34 and acts as a check valve to prevent the flow of fuel out of the fuel filter assembly 10 through the fuel inlet 28.

With reference to FIG. 2, the cap assembly 40 is comprised of a cap member 42, a centrally disposed, axially extending conduit member 44, and an exteriorly projecting outlet member 46. The cap member 42 is comprised of resilient elastomeric material, such as rubber polymers, such as Viton™ material or BUNA material, or thermal plastic elastomers, such as Hytrel™ material. The cap member 42 is an inverted cup-like receptacle which defines a cavity 48 for receiving upper portions of the disposable cartridge 90. The cap member has an axial opening 56. The lower edge portion 50 of the cap member 42 defines an outwardly projecting lip 52 having a lower surface 54 which is engageable with the rim 25 on the container member 24. When the retainer collar 14 is tightened, the lip lower surface 54 engages the container member rim 25 to seal the cap assembly 40 to the container assembly 20.

The conduit member 44 comprises a flange 62 and a stepped sleeve-like conduit 64 which extends axially downwardly from the flange 62. The conduit 64 is comprised of an upper first portion 66, a lower second portion 68, and an intermediate third portion 70. The inside and outside diameters (ID1, OD1) of the first portion 66 are larger than the inside and outside diameters (ID2, OD2) of the second portion 68, respectively. The inside diameter of the third portion 70 tapers from approximately ID1 at the upper end to approximately ID2 at the lower end. The flange 62 is attached to the underside surface 60 of the cap member 42 in a position where the conduit 64 is generally coaxial with the cap member opening 56.

The outlet member 46 comprises first and second portions 74, 76 that define first and second passages 78, 80, respectively. The first passage 78 is in fluid communication with the second passage 80. The outlet member first portion 74 is received by the cap member opening 56 and the conduit first portion 66 wherein the first passage 78 is substantially coaxial with the cap member opening 56 and conduit 64. The first passage 78 has an upper first portion 82 and a lower second portion 84 wherein the diameter of the second portion 84 is greater than the diameter of the first portion 82. A spherical ball 86 captured in the second portion 84 of the first passage 78 and second portion 68 of the conduit member 44 seats against the tapered passage of the conduit third portion 70, preventing fluid flow through the outlet member 46 into the fuel filter assembly 10. The reduced diameter of the first portion 82 of the first passage 78 prevents the ball 86 from leaving the second portion 84 of the first passage 80.

With reference to FIG. 2, the disposable filter cartridge 90 comprises a filter element 92 which has a continuous fan-shaped pleated configuration The filter element 92 defines an interior axial chamber 94 and a quasi-annular outer chamber 96. A water barrier is employed in the filter element 92 to prevent water from going through the filter element 92. With reference to FIG. 1, a drain plug 30 disposed in a drain port 32 provides means for draining water removed from the fuel. O-rings or other suitable means prevent leakage through the drain port. A water sensor 39 may be disposed in the lower portion of the container cavity 22 to provide a positive indication that the fuel filter assembly 10 must be drained.

The upper and lower ends of the element 92 are engaged by upper and lower plates 98, 100. The upper plate 98 has a central axial opening 102 that slidably receives the conduit 64. The upper plate opening 102 and the conduit 64 are dimensioned to provide a loose fit, allowing the flow of fuel through the gap between the opening 102 and the conduit 64. Alternatively, the upper plate 98 may have slots or orifices (not shown) to allow an additional flow of fuel through the plate 98. In a preferred embodiment, a central portion 104 of the upper plate 98 defines a cup-like receptacle which defines a cavity 106 for receiving a first end 112 of a spring 110. The spring 110 is disposed around the conduit 64 and the second end 114 of the spring 110 bears against the conduit member flange 62.

The fuel filter assembly 10 may be primed by pushing the upper portion 57 of the cap member 42 downwards. The downwards force will compress the spring 110, allowing the upper portion 57 of the cap member 42 to be pushed into the upper cavity 48. Air that is trapped in the upper cavity 48 will be expelled from the cavity through an orifice 88 and through the conduit 64. Air flowing into the conduit 64 will cause ball 86 to unseat, forcing the air to exit from the fuel filter assembly 10. The pressure created by pushing the cap member upper portion 57 downwards seats ball 38, preventing fuel from leaving the fuel filter assembly 10. Removing the downwards force will allow the spring 110 to return to its normal length, forcing the upper portion 57 of the cap member 42 upwards. This will cause a low pressure to develop in the upper cavity 48. This low pressure is communicated to the filter element interior cavity 94 via the gap between the conduit 64 and the plate central opening 102. The low pressure causes the ball 86 to seat, preventing fuel and air from entering the fuel filter assembly 10 through the outlet member 46. The low pressure provides a driving head, unseating ball 38 and causing fuel to flow from the fuel tank to the fuel filter assembly 10. In a alternate embodiment, a primer mechanism, which is actuable by pressing the cap member 42, may be housed in the container assembly 20.

The cap member 42 provides a visual indication of the fouling of the filter element 92. As the fuel filter assembly 10 removes particulate matter from the fuel, the filter element becomes fouled and a higher differential pressure is required to draw fuel through the element. In a vacuum application, this results in an increased vacuum in the filter element annular cavity 94. Continued use causes increased fouling and a resultant increase in vacuum in the filter element annular cavity 94. The vacuum in the filter element annular cavity 94 is communicated into the upper cavity 48 via the gap between the conduit 64 and the plate central opening 102. The spring force of the spring 110 is selected such that atmospheric pressure acting on the outside surface 58 of the cap member 42 and the vacuum acting on the inside surface 60 of the cap member 42 will start to overcome the spring force when the fouling has reached a predetermined value. As the fouling increases past this value, the increased vacuum will cause the cap member upper portion 57 to progressively collapse towards the container assembly, thereby providing visual indication that the filter element 92 must be changed. In a pressurized fuel system, the spring 110 is extended prior to being connected to the upper plate 98 and the cap member 42. The spring force of the spring 110 is selected such that the spring force will start to overcome the force of the pressurized fuel on the inside surface 60 of the cap member 42 when the fouling has reached a predetermined value. As the fouling increases past this value, the decreased pressure will exert a smaller force on the cap member inside surface 60 causing the spring 110 to draw the cap member upper portion 57 progressively towards the container assembly.

Figure 4:
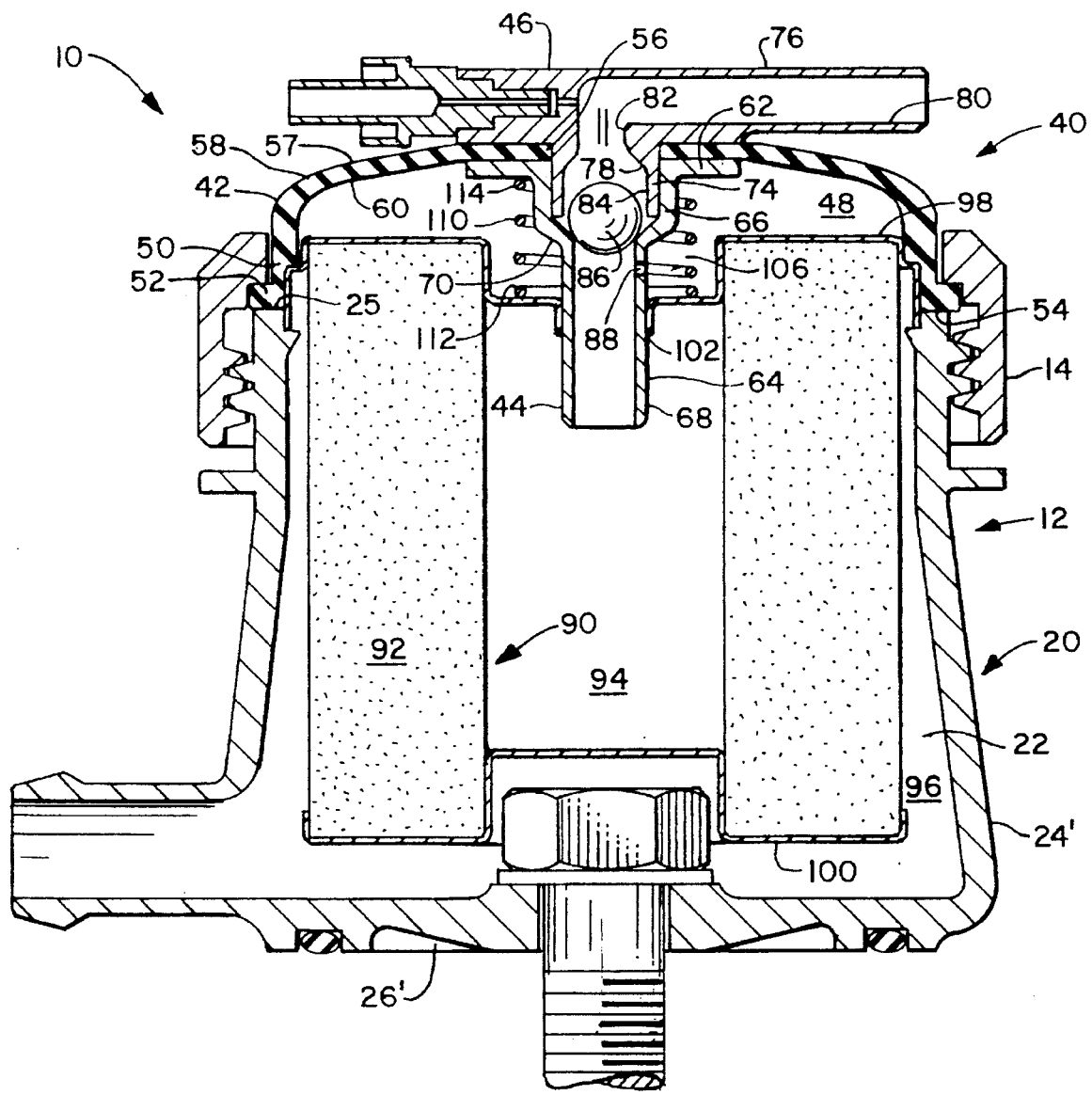
FIG. 4 is a side sectional view of an alternate embodiment of a fuel filter assembly in accordance with the invention.
Figure 5:
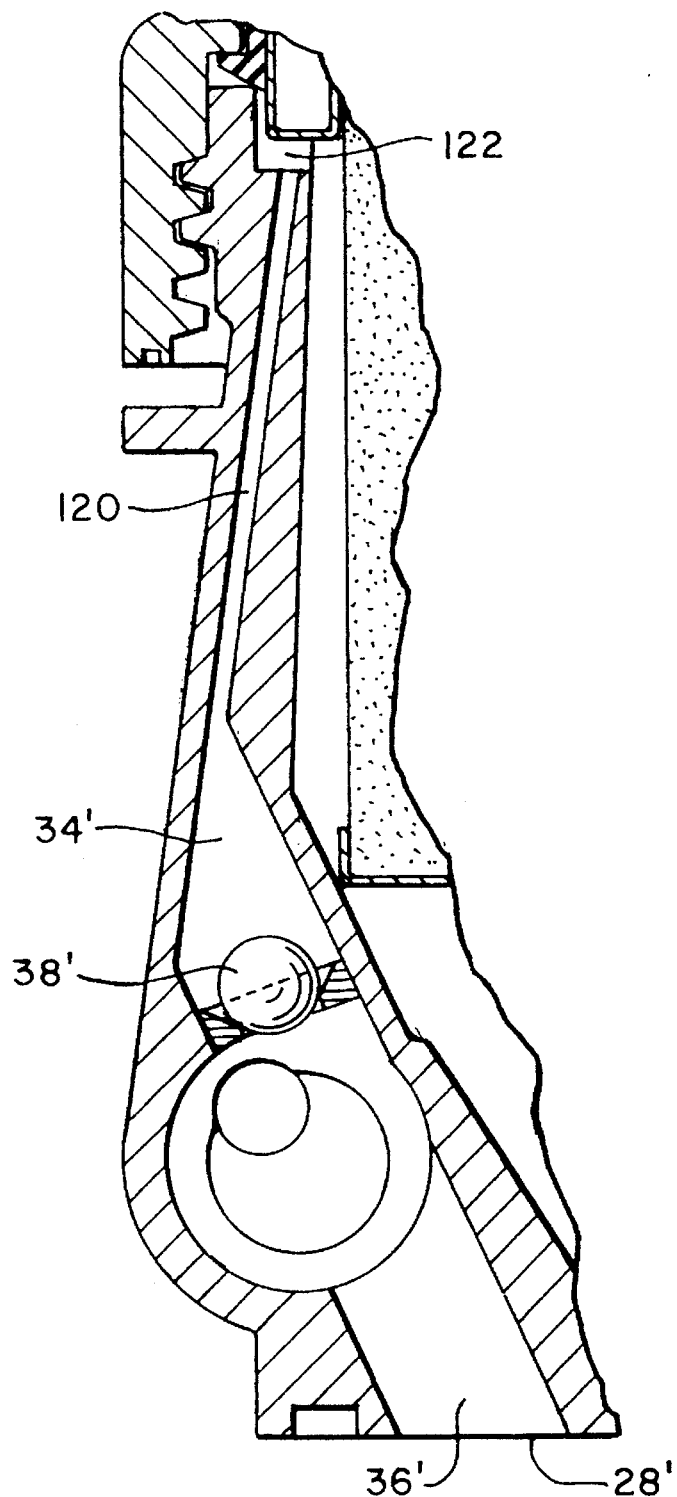
FIG. 5 is an enlarged fragmentary sectional view of a fuel inlet portion of the fuel filter assembly of FIG. 4.

FIGS. 4 and 5 show an alternate embodiment of a fuel filter assembly in accordance with this invention. In this embodiment, the bracket means 26' is integral with the container member 24' and is located at the bottom portion of the container member 24'. The fuel inlet 28' is comprised of first, second and third passageways 34', 36', 120. The passageways are in fluid communication and provide a flow path from the bottom of the container member 24' to a plenum 122 in the upper portion of the container member 24'. A spherical ball 38' acts as a check valve to prevent the flow of fuel out of the fuel filter assembly, as in the first embodiment.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A fuel filter assembly for removing foreign particles from a flow of fuel, said filter assembly comprising:

container means;

cap means comprising a cap member composed of an elastomeric material, wherein said container means and said cap member define a housing, said cap member being resiliently deformable;

filter cartridge means mountable in said housing for filtering fuel; and fuel inlet and fuel outlet means providing fluid communication with said fuel filter assembly.

2. The fuel filter assembly of claim 1 whereby said cap means defines a hand-primer wherein said fuel filter assembly is primed by deforming said cap means to create a low pressure within said housing.

3. The fuel filter assembly of claim 1 wherein said fuel inlet means comprises check valve means wherein said check valve means prevents flow out of said fuel filter assembly via said fuel inlet means.

4. The fuel filter assembly of claim 3 wherein said fuel inlet means further comprises first and second passageways disposed in said container means, said check valve means being disposed in said first passageway.

5. The fuel filter assembly of claim 1 wherein said cap means further comprises flange means and conduit means, said conduit means being centrally disposed on and axially extending from said flange means.

6. The fuel filter assembly of claim 5 wherein said cartridge means comprises at least one filter element and a first plate, said first plate having an opening for slidably receiving said conduit means.

7. The fuel filter assembly of claim 6 wherein said conduit means defines an axial passage, said conduit means passage being in fluid communication with said fuel outlet means.

8. The fuel filter assembly of claim 7 wherein said cap member defines a cavity and said conduit means comprises orifice means, said orifice means providing fluid communication between said cap member cavity and said conduit means passage.

9. The fuel filter assembly of claim 6 wherein said conduit means comprises first and second sections wherein said first section is slidably received by said first plate opening.

10. The fuel filter assembly of claim 9 wherein said conduit means defines a conical seating surface.

11. The fuel filter assembly of claim 10 wherein said cap means further comprises ball means housed in said conduit means, said ball means being engageable with said seating surface to prevent flow of a fluid.

12. The fuel filter of claim 1 wherein said cap member is composed of material selected from the group consisting of rubber polymers and thermal plastic elastomers.

13. The fuel filter assembly of claim 1 wherein said fuel outlet means comprises check valve means wherein said check valve means prevents flow into said fuel filter assembly via said fuel outlet means.

14. The fuel filter assembly of claim 13 wherein said fuel outlet means comprises first and second portions defining first and second passageways, said check valve means being disposed in said first passageway.

15. The fuel filter assembly of claim 14 wherein said cap member further comprises an axial opening, said cap member opening receiving said fuel outlet means first portion.

16. The fuel filter assembly of claim 1 further comprising spring means having opposite first and second ends, said spring means first end being engageable with a surface of said filter cartridge means, said spring means second end being engageable with a surface of said cap means wherein said spring means exerts a spring force that biases said cap member surface away from said filter cartridge means.

17. The fuel filter assembly of claim 16 wherein said filter cartridge means comprises a first plate having first and second portions, said first portion defining a receptacle for receiving said spring means first end.

18. The fuel filter assembly of claim 17 wherein said cap member has an exterior surface and an interior surface, said exterior surface being subjected to an atmospheric pressure, said atmospheric pressure exerting a force on said exterior cap surface, said filter cartridge means and container means defining an interior axial chamber and an outer chamber, said interior and exterior chambers each containing a volume of fuel having a pressure, flow of fuel through said fuel filter assembly creating a differential pressure across said filter cartridge wherein said interior chamber pressure is a partial vacuum, said partial vacuum exerting a force on said interior cap surface, said differential pressure increasing as said filter cartridge removes additional foreign particles from the flow of fuel whereby said partial vacuum increases, said spring means having a spring force wherein said atmospheric pressure force and said partial vacuum force exceed said spring force when a predetermined amount of foreign particles have been removed by said filter cartridge.

19. The fuel filter assembly of claim 17 wherein said filter cartridge means further comprises a second plate.

20. The fuel filter assembly of claim 5 wherein said conduit means comprises check valve means wherein said check valve means prevents flow into said fuel filter assembly via said fuel outlet means.

21. The fuel filter assembly of claim 1 further comprising hand-primer means disposed within said container, wherein said hand primer means is operable by deforming said cap means.

22. The fuel filter assembly of claim 1 further comprising spring means having opposite first and second ends, said spring means first end being engageable with a surface of said filter cartridge means, said spring means second end being engageable with a surface of said cap means wherein said spring means exerts a spring force that biases said cap member surface towards said filter cartridge means.

23. The fuel filter assembly of claim 22 wherein said cap member has an interior surface, said filter cartridge means and container means defining an interior axial chamber and a quasi-annular outer chamber, said interior and exterior chambers each containing a volume of fuel having a pressure, flow of fuel through said fuel filter assembly creating a differential pressure across said filter cartridge wherein said interior chamber pressure is a positive pressure, said positive pressure exerting a force on said interior cap surface, said differential pressure increasing as said filter cartridge removes additional foreign particles from the flow of fuel whereby said positive pressure decreases, said spring means having a spring force wherein said spring force exceeds said positive pressure force when a predetermined amount of foreign particles have been removed by said filter cartridge.

24. A method for indicating that a filter cartridge requires replacement, the filter cartridge defining an axial chamber, the axial chamber containing fluid which is at a partial vacuum when there is flow through the filter cartridge, the method comprising the steps of:

mounting a flexible member having opposite first and second sides to a container structure for said cartridge;

biasing said flexible member by means of a biasing force;

exposing said flexible member first side to an atmospheric pressure wherein said pressure exerts a force on said flexible member first side;

exposing said flexible member second side to the fluid partial vacuum wherein said vacuum exerts a force on said flexible member second side, whereby said flexible member collapses to a deformed condition, said deformed condition providing a visual and tactile indication when said pressure force exceeds said vacuum force and said biasing force.

* * * * *